(12) United States Patent
Zhang et al.

(10) Patent No.: US 8,142,710 B2
(45) Date of Patent: Mar. 27, 2012

(54) REDUCTION APPARATUS, REDUCTION APPARATUS MANUFACTURE METHOD, AND VACUUM SMELTING REDUCTION FURNACE USING THE SAME

(75) Inventors: Jiqiang Zhang, Guizhou (CN); Kui Ming Wong, Hong Kong (CN)

(73) Assignee: MG Century Mining Corporation, Guiyang (CN)

( * ) Notice: Subject to any disclaimer, the term of this patent is extended or adjusted under 35 U.S.C. 154(b) by 488 days.

(21) Appl. No.: 12/369,632

(22) Filed: Feb. 11, 2009

(65) Prior Publication Data
US 2009/0140472 A1 Jun. 4, 2009

(51) Int. Cl.
*C21C 5/40* (2006.01)

(52) U.S. Cl. .......................... 266/171; 266/168
(58) Field of Classification Search .................. 266/168, 266/171
See application file for complete search history.

(56) References Cited

U.S. PATENT DOCUMENTS

| 2,365,346 | A | * | 12/1944 | Kruh | 373/59 |
| 2,766,034 | A | * | 10/1956 | Najarian | 266/149 |
| 4,488,904 | A | | 12/1984 | Miura et al. | 75/62 |

FOREIGN PATENT DOCUMENTS

| CN | 2170952 Y | 7/1994 |
| CN | 1345982 A | 4/2002 |
| CN | 2495967 Y | 6/2002 |
| CN | 1360060 A | 7/2002 |
| JP | 57-89444 | 6/1982 |
| JP | 58-81534 | 5/1983 |
| JP | 6-6758 | 6/1994 |

OTHER PUBLICATIONS

Wu et al., "*Fabrication of high aluminia abrasion-resistent castable*", Jan. 2002, vol. 19, No. 1, pp. 34-37, The Journal, J. of Anhui University of Technology. http://www.cqvip.com.

* cited by examiner

*Primary Examiner* — Scott Kastler
(74) *Attorney, Agent, or Firm* — Martine Penilla Group LLP

(57) ABSTRACT

The invention discloses a reduction apparatus having a main body made of silicon carbide-based material and collectively formed by a top portion, a bottom portion, and a side portion, wherein the bottom portion includes a slanted plane, and the main body has an inlet and a metallic vapor exit provided near the top portion and an outlet provided near the lowest end of the slanted bottom portion; an inlet closure connected with the inlet; an outlet closure connected with the outlet; and a metal collector or a condenser connected with the metallic vapor exit. The invention solved problems found in conventional reduction retorts, including: small capacity, low metal output, inconvenience in charging reactant material and discharging spent residue, and heavy workload for workers. The invention also shortened the time for reduction reaction, increased production efficiency and output of the reduction furnace, and reduced production cost. The invention can be used in production of metal such as magnesium, strontium, zinc, and beryllium by vacuum smelting reduction process.

32 Claims, 9 Drawing Sheets

REDUCTION APPARATUS, REDUCTION APPARATUS MANUFACTURE METHOD, AND VACUUM SMELTING REDUCTION FURNACE USING THE SAME

CLAIM OF PRIORITY

This application claims priority under 35 U.S.C. §§ 120 and 365(c) as a continuation application of prior International Application PCT/CN2007/002428, which was filed on Aug. 13, 2007, and which was not published in English under PCT Article 21(2). The disclosure of the prior international application is incorporated herein by reference.

TECHNICAL FIELD

The invention relates to a vacuum smelting apparatus and, more particularly, to a reduction apparatus and reduction furnace for smelting metal under vacuum reduction.

BACKGROUND ART

The structure of a conventional vacuum smelting reduction furnace is composed of, as shown in FIG. 1, a reduction retort 1, a condenser 2, and a chamber structure 3. The reduction retort 1 is horizontally disposed and supported by supports 4 and 5, wherein the end of the reduction retort 1 at where the condenser 2 is disposed is projected beyond the chamber structure 3, and the other end of the reduction retort 1, which is closed, is placed within the chamber structure 3. The charging of reactant material and the discharging of spent residue is carried out through the end of the reduction retort 1 at where the condenser 2 is disposed. The conventional reduction retort and the manner it is disposed in the reduction furnace are inconvenient for the charging and discharging processes. It is very labor-intensive and requires a lot of time and energy in production. In addition, it also has low fill rate and low unit throughput due to the small volume of one single reduction retort.

Furthermore, in the metal production process by vacuum smelting reduction method, after charging the reduction retort with the reactant material, depending on the type of metal and reducing agent used, the reduction reaction temperature is generally maintained between 1000 and 1200° C. and the pressure is reduced to vacuum for the reduction reaction to take place. The reduction reaction temperature can be attained by heating the reduction retort with fuel or electricity. The conventional reduction retort is of a circular tubular structure. In the reduction process, heat is transferred from the inner wall of the reduction retort to the reactant material that is in direct contact with the wall. As for the reactant material that is not in direct contact with the inner wall of the reduction retort, heat is transferred thereto through radiation or from other reactant material through conduction. Because of the low thermal conductivity of the reactant material, it is apparent that the temperature of reactant material that is in direct contact with the inner wall of the reduction retort would be elevated much faster than the temperature of the reactant material that has to rely on the heat transfer from the reactant material next to them. Hence, it takes very long time for all the reactant material to reach the needed reduction reaction temperature. The reduction time, from the charging of material to the completion of reduction reaction, for metal production process by vacuum smelting reduction method using conventional reduction retort is generally between 6 and 15 hours. In general, the time needed for a retort with larger diameter would be longer, and so the size of the reduction retort is limited accordingly. Obviously, long reduction time, low production efficiency and output, large energy wastage and high cost are the shortcomings of the conventional reduction retort.

Moreover, in the metal production process by vacuum smelting reduction method mentioned above, the internal pressure of the reduction retort is generally required to be less than 100 Pa. The metallic vapor constantly travels from the reactant material to the condenser during the reduction reaction process. Regional pressure may build up if the metallic vapor is trapped and accumulated within the reactant material pile. The build-up of the regional pressure to more than 100 Pa in the region where the reactant material are thickly piled will inhibit further reduction reaction from taking place, affecting the normal course of reduction reaction, and hence resulting in lower production output and wastage of energy.

Furthermore, the operating condition for a reduction retort in a metal production process by vacuum smelting reduction method is very severe, therefore refractory material is needed to make reduction retorts. However, heat-resisting metal that is resistant to higher temperature and suitable for long duration of use is very expensive. Conventionally, the general material used to make reduction retorts is heat resisting nickel-chrome-steel alloy that has a maximum working temperature of 1200° C. under vacuum condition. The strength of the reduction retort made of this material is often enhanced by thickening its wall. However, this type of reduction retort has a short service life. It is easy to sustain damages like oxidation, creep, tear, etc. at high temperature. Therefore, large quantity of heat-resisting metal is needed to make a reduction retort, leading to high smelting cost. Not only is the need for constant turning and changing of such reduction retort very labor-intensive and time-consuming in production, it also leads to heat loss of the reduction furnace. Besides, the reduction time of metal production process by using such reduction retort, which has a maximum working temperature of 1200° C., is significantly longer as compared to the reduction time of the same process carried out at a temperature much higher than 1200° C.

DISCLOSURE OF INVENTION

An object of the invention is to provide a reduction apparatus that has a much greater volume for reactant material to be filled therein in comparison to the conventional reduction retort. Moreover, the reduction apparatus can increase the charging speed of reactant material and the discharging speed of spent residue in a metal production process by vacuum smelting reduction method. Accordingly, the production efficiency and unit output of a reduction furnace is enhanced while the production cost is reduced.

Another object of the invention is to provide a reduction apparatus that is resistant to the oxidation, creep, and tear phenomenon at high temperature, which are easily incurred in the conventional reduction retort made by heat resisting nickel-chrome-steel alloy. As a result, the service life of the reduction apparatus is prolonged.

The invention discloses a reduction apparatus that includes: a main body made of silicon carbide-based material and collectively formed by a top portion, a bottom portion, and a side portion, the main body having an inlet and a metallic vapor exit provided near the top portion, and an outlet provided near the bottom portion, wherein the bottom portion includes a slanted plane; an inlet closure connected with the inlet; an outlet closure connected with the outlet; and a condenser or a metal collector connected with the metallic vapor exit.

One embodiment of the invention includes hot gas pipes, which are solidly bonded to the main body and penetrate the top portion and the bottom portion of the main body. The hot gas pipes increase the heat transfer from the main body of the reduction apparatus to the reactant material during the metal production process by vacuum smelting reduction method, thereby shortening the reduction reaction time.

Another embodiment of the invention includes vapor passages provided inside the main body of the reduction apparatus to timely and quickly eliminate high metallic vapor pressure formed in some parts of the reduction apparatus, thereby shortening the time for reduction reaction. The metallic vapor could escape from the reactant material pile to the metallic vapor exit by traveling along the vapor passages quickly.

Yet in another embodiment of the invention, the reduction apparatus includes a heat-insulating plug provided at each of the inlet and the outlet for reducing heat dissipation. The heat-insulating plug in the outlet is also used to hold the reactant material in the reduction apparatus so that the reactant material stays within the chamber of the reduction furnace throughout a metal production process by vacuum smelting reduction method. In addition, a heat-insulating section can be provided at each junction between the inlet closure and the inlet, between the outlet closure and the outlet, and between the metal collector or the condenser and the metallic vapor exit, to minimize heat loss.

The invention also discloses a reduction apparatus manufacture method, which includes: forming a main body that is made of silicon carbide-based material and collectively formed by a top portion, a bottom portion, and a side portion, the main body having an inlet and a metallic vapor exit provided near the top portion, and an outlet provided near the bottom portion, wherein the bottom portion includes a slanted plane; disposing an inlet closure at the inlet; disposing an outlet closure at the outlet; and disposing a metal collector or a condenser at the metallic vapor exit.

The reduction apparatus may be formed by mixing silicon carbide-based refractory material or batter material with 4-10% of water and then casting the mixture in a mold or battering the mixture into shape. A reduction apparatus formed as such has strengthened resistance to compression, bending, and tension, and so its service life is prolonged while the usage and manufacture cost thereof are reduced.

The invention further discloses a vacuum smelting reduction furnace, which includes: an aforementioned reduction apparatus and a chamber structure. The main body of the reduction apparatus is positioned inside the chamber that is surrounded by the chamber structure while the metal collector, the inlet closure, and the outlet closure are disposed outside of the chamber structure.

The invention solves the shortcomings found in conventional reduction retorts, these shortcomings including small capacity for reactant material, low metal output, and heavy workload for workers due to inconveniences in charging of reactant material and discharging of spent residue. The invention further exhibits other improvements, which are increased volume for reactant material to be filled therein, shortened reduction time, enhanced production efficiency and output of the reduction furnace, and lowered production cost. The invention is applicable to metal production of magnesium, strontium, zinc, beryllium, and other metal that can be produced by vacuum smelting reduction method.

Figure 1:
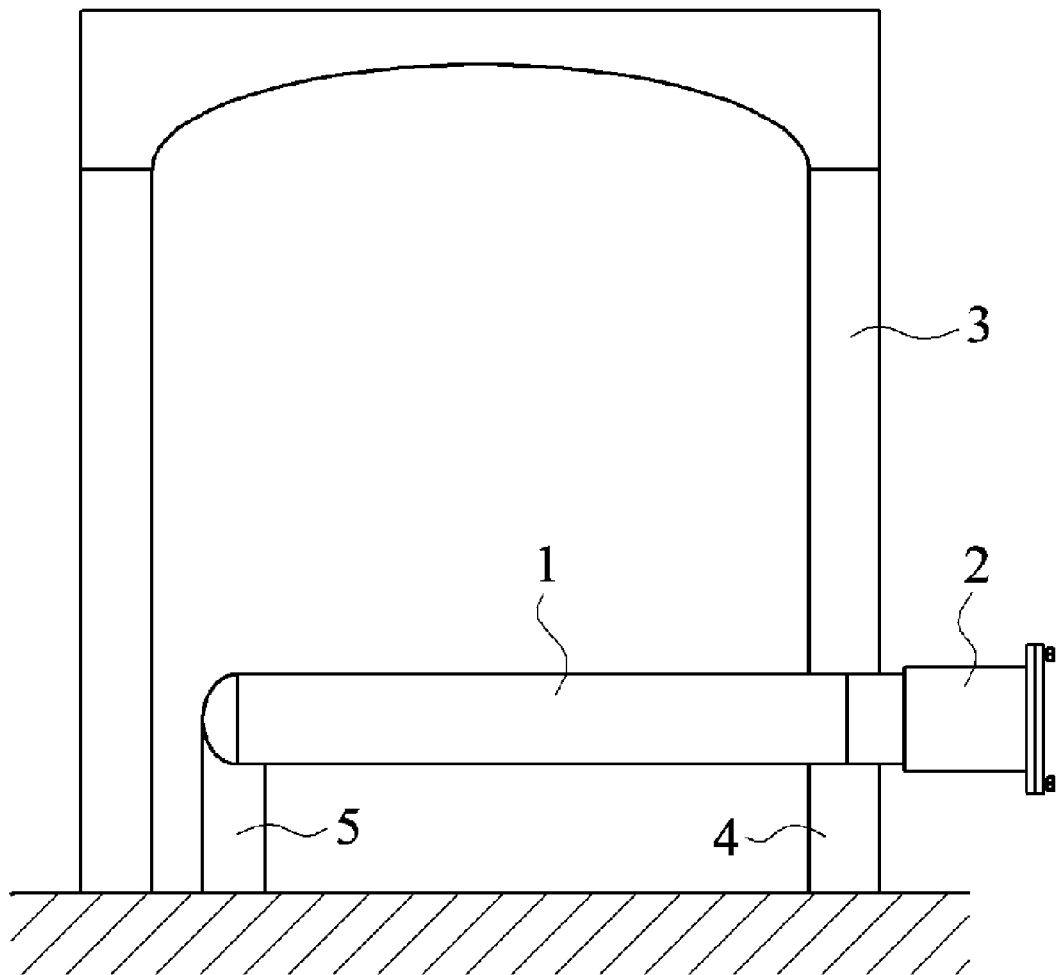
FIG. 1 is a schematic diagram illustrating a conventional reduction retort and its placement in a reduction furnace.

The reference numbers in the drawings correspond to the following components: 1—reduction retort; 2—condenser; 3—chamber structure; 4, 5—support; 10, 10'—reduction apparatus; 11—top portion; 12—bottom portion; 13—side portion; 14—inlet; 15—outlet; 16—metallic vapor exit; 17—inlet closure; 18—outlet closure; 19—metal collector or condenser; 20—chamber structure; 21—chamber; 30, 30', 30"—hot gas pipe; 31—passageway; 40—guiding structure; 41—through hole; 42—space near the top portion of the reduction apparatus; 43—groove; 50—heat-insulating plug; 51—rod; 60—heat-insulating section; 61—flange; 62—bolt.

BEST MODE FOR CARRYING OUT THE INVENTION

Figure 2:
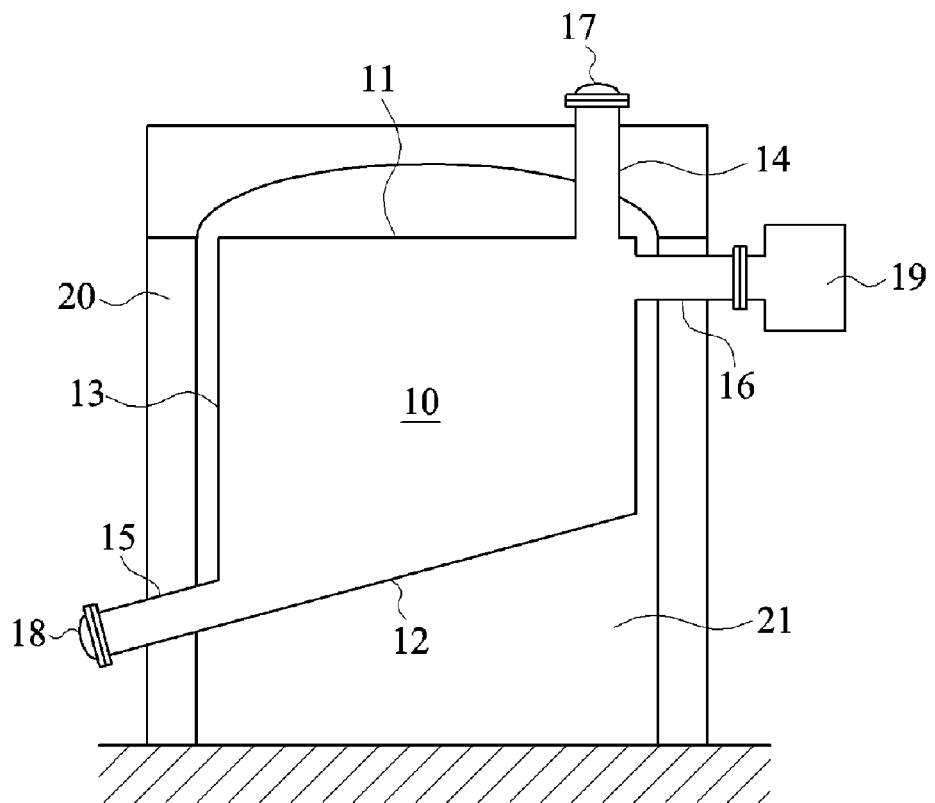
FIG. 2 is a schematic diagram illustrating a reduction apparatus and a vacuum smelting reduction furnace according to an embodiment of the invention.

FIG. 2 illustrates the structure of a vacuum smelting reduction furnace of the invention. The reduction furnace includes a reduction apparatus 10 and a chamber structure 20. The reduction apparatus 10 includes: a main body having a top portion 11, a bottom portion 12, and a side portion 13; an inlet closure 17, an outlet closure 18, and a metal collector or a condenser 19. The bottom portion 12 of the main body includes a slanted plane. The main body further includes an inlet 14 provided at the top portion 11, a metallic vapor exit 16 provided at the side portion 13 near the top portion 11, and an outlet 15 provided at the side portion 13 near the bottom portion 12. The inlet closure 17 is connected with the inlet 14, the outlet closure 18 is connected with the outlet 15, and the metal collector or the condenser 19 is connected with the metallic vapor exit 16. Referring to the structure of the reduction furnace of the invention as a whole, the main body of the reduction apparatus 10 is positioned inside the chamber 21 surrounded by the chamber structure 20 while the inlet closure 17, the outlet closure 18, and the metal collector/the condenser 19 project beyond and are disposed outside of the chamber structure 20 as shown in FIG. 2.

Figure 3:
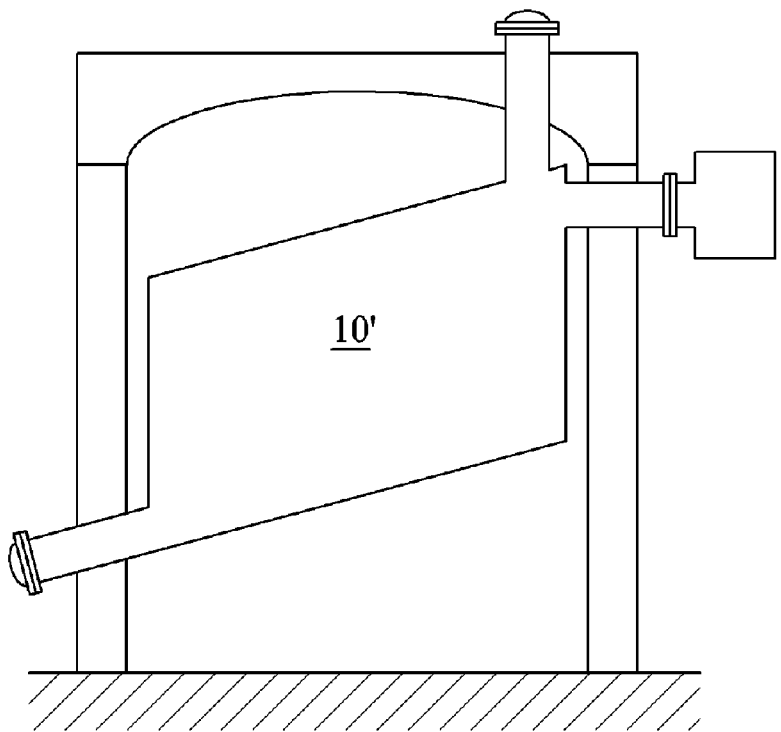
FIG. 3 is a schematic diagram illustrating a reduction apparatus according to another embodiment of the invention.

The invention does not have specific limitation on the positions where the inlet 14, the outlet 15, and the metallic vapor exit 16 should be set. However, for convenience in charging reactant material and collecting metallic vapor, the inlet 14 and the metallic vapor exit 16 may be provided near the top portion 11 of the main body, and, for easy discharging of spent residue, the outlet 15 may be provided at the lowest point of the bottom portion 12 of the main body. Moreover, the bottom portion 12 of the main body of the reduction apparatus 10 can be designed to comprise a slanted plane to increase the speed of charging reactant material and discharging spent residue in the production process. The slanted plane can be a slanted flat surface, a slanted conical surface, or a slanted circular arc surface. The slanted plane is inclined at an inclination angle of 20° to 70° from a horizontal plane, and the inclination angle is preferably 30° to 60°. Besides the slanted bottom portion 12, there is no other limitation on the shape of the main body of the reduction apparatus 10 of the invention. For example, if available volume is a major consideration, the main body can be designed to be a cylinder with obliquely truncated bottom like the reduction apparatus 10 shown in FIG. 2; and if easy manufacture is the major consideration, then the main body can be designed as a cylinder with obliquely truncated top and obliquely truncated bottom like the reduction apparatus 10' shown in FIG. 3.

An operation procedure of the reduction apparatus 10 is described below. When reactant material needs to be charged for a vacuum smelting process, the inlet closure 17 is opened and reactant material is charged into the reduction apparatus 10 from the inlet 14. Since the bottom portion 12 of the main body is inclined, the reactant material would automatically move towards the lowest point of the bottom portion 12 due to self-weight, and thus, the workload for charging material is lightened. Also, the fill rate of materials in the reduction apparatus is increased and it is easier to manage the volume of reactant material charged into the reduction apparatus. These factors are good for the realization of a complete reduction reaction and subsequently the heat utilization rate is increased. After the material is added, the inlet 14 is hermetically closed with the inlet closure 17, and a reduction reaction is carried out. After the reaction is complete, the outlet closure 18 is opened to remove spent residue. Since the outlet 15 is at the slanted bottom portion 12 of the main body, the spent residue, due to self-weight, is very easily removed out of the reduction apparatus 10, resulting in a decrease in workload. Therefore, in comparison to conventional reduction retorts, the reduction apparatus of the invention can not only have a much greater volume available for reactant material to be filled therein but also increase the charging speed of the reactant material and the discharging speed of the spent residue in the metal production process by vacuum smelting reduction method. Therefore, enhanced production efficiency and unit output of the reduction furnace with reduced production cost is achieved.

Figure 4:
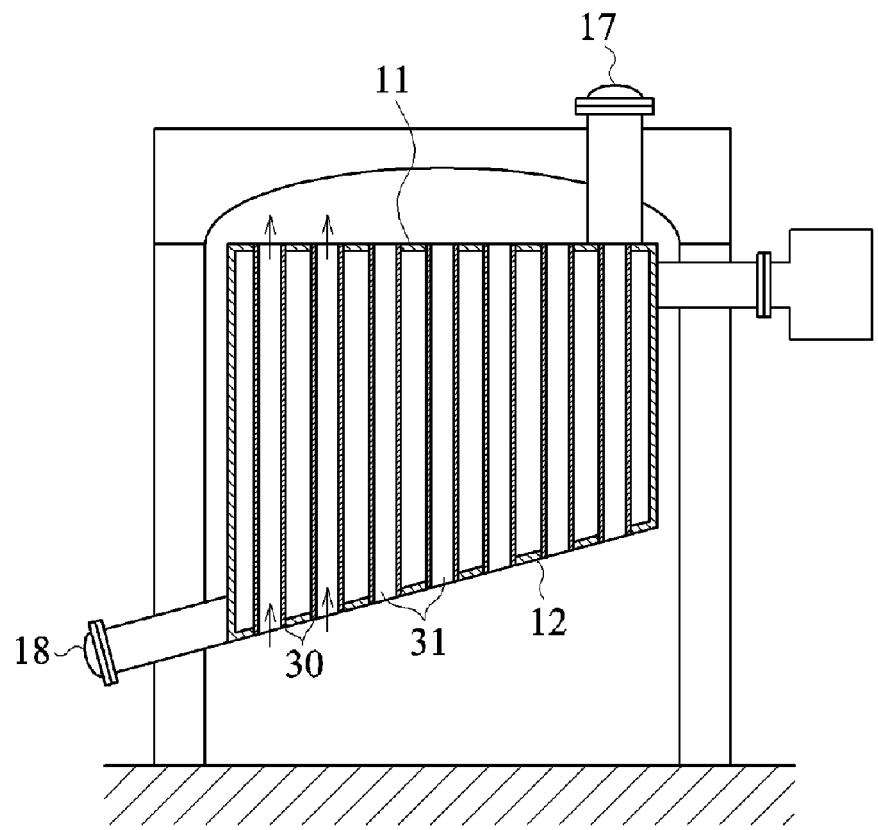
FIG. 4 is a schematic diagram illustrating hot gas pipes provided inside a main body of a reduction apparatus of the invention.
Figure 5:
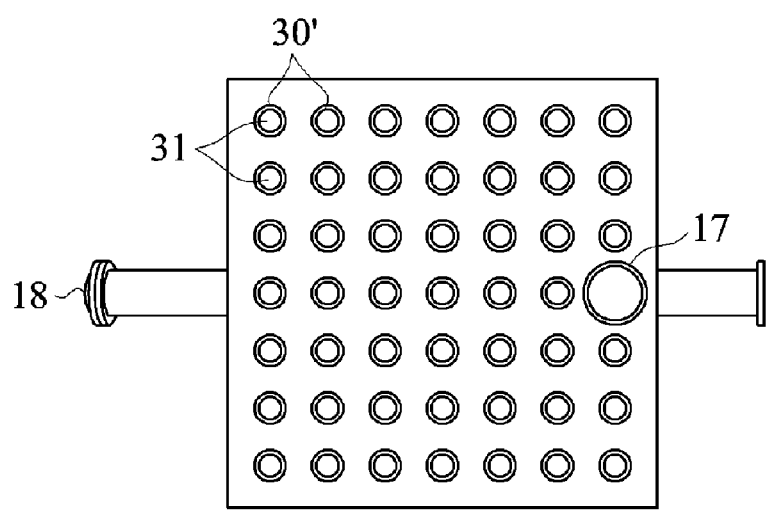
FIG. 5 is a top view of a reduction apparatus having circular hot gas pipes.
Figure 6:
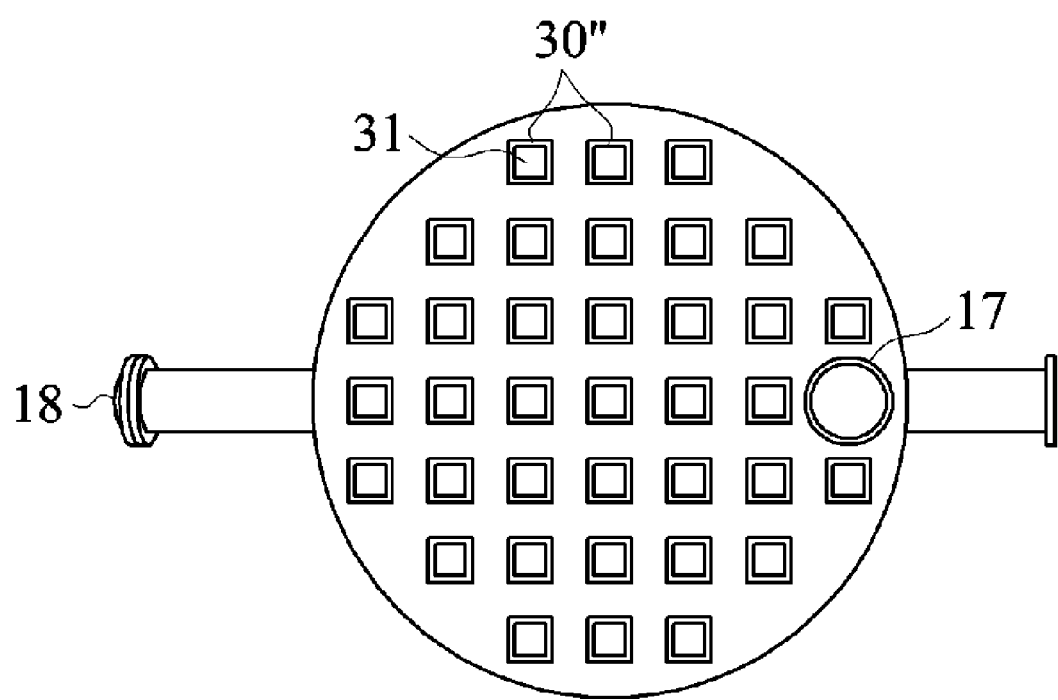
FIG. 6 is a top view of a reduction apparatus having square hot gas pipes.

In order to improve deficiencies of conventional reduction retorts—long heating time for reduction reaction, low production efficiency and output per unit time, large consumption of energy, and high production cost, hot gas pipes 30 are introduced in another embodiment of the invention as shown in FIG. 4. The hot gas pipes 30 are provided inside the main body of the aforementioned reduction apparatus and are solidly bonded thereto while penetrate through the top portion 11 and the bottom portion 12 of the main body. The solid bonding is achieved by casting the hot gas pipes 30 and the main body in a single mold. The hot gas pipes 30 provide passageways 31 for high temperature fumes between two ends in the furnace, and at the same time, increase the heat conduction area inside the reduction apparatus and shorten the heat conduction distance between the hot gas pipes 30 and the reactant material. Consequently, the reactant material can be heated more rapidly. The aforementioned hot gas pipes 30 can be any shape and in any arrangement so long as heat conduction effect is enhanced. For example, they can be circular hot gas pipes 30' as shown in FIG. 5 with a main body of the reduction apparatus being a square cylinder with obliquely truncated bottom, or square hot gas pipes 30" as shown in FIG. 6 with a main body of the reduction apparatus being a circular cylinder with obliquely truncated bottom. For a best heat conduction effect, the shape and arrangement of the hot gas pipes are such that the distance between any reactant material and the closest hot gas pipe or the closest wall of the main body should not exceed 12 cm, and more preferably, 6 cm. Comparing to conventional technology, this embodiment of the invention greatly increases the heating speed of reactant material in the reduction apparatus, enhances the production efficiency and output per unit time, lowers energy consumption, and reduces production cost, by disposing hot gas pipes in the reduction apparatus.

Figure 7:
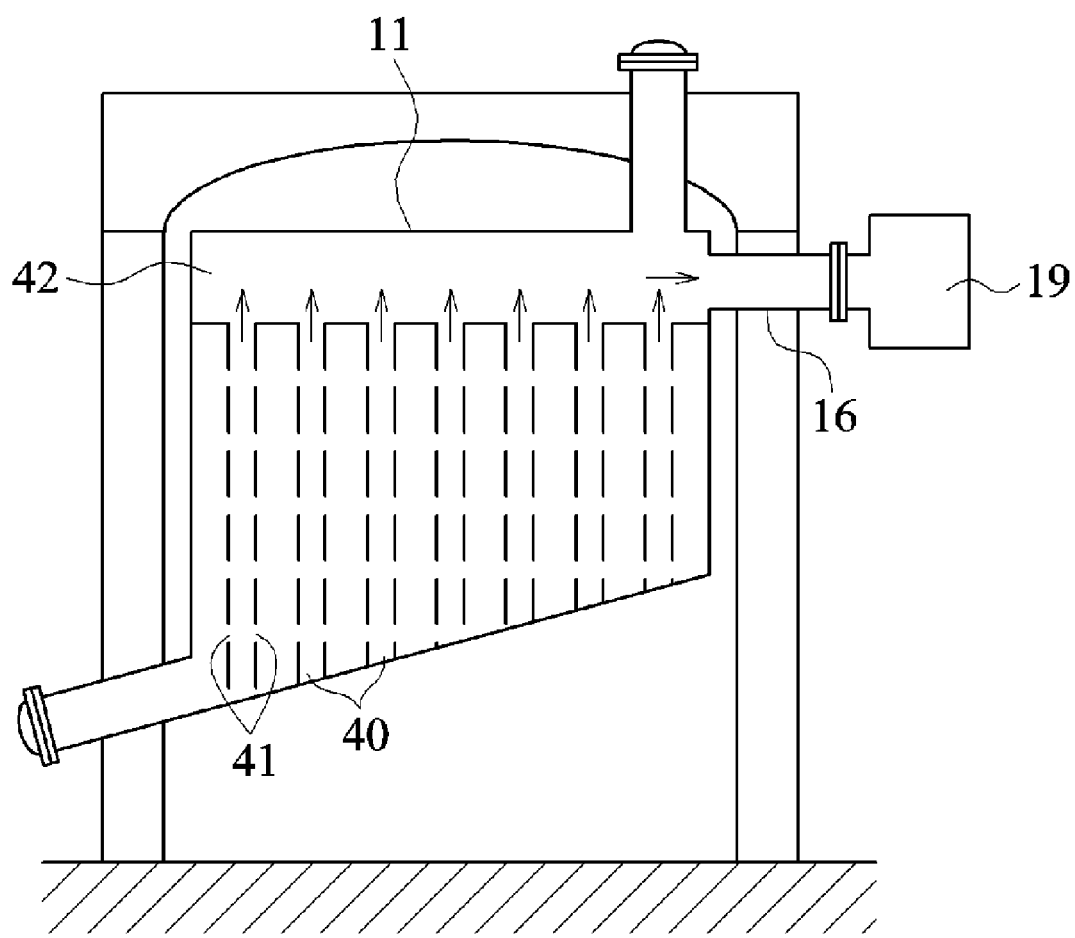
FIG. 7 is a schematic diagram illustrating vapor passages provided inside a reduction apparatus of the invention, wherein the vapor passages are tubes with through holes.
Figure 8:
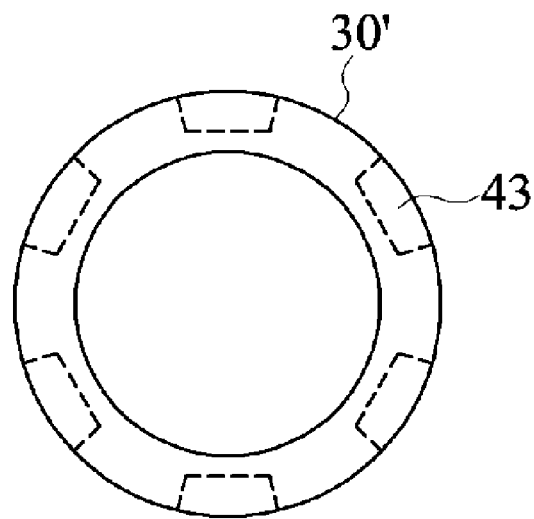
FIG. 8 is a schematic diagram illustrating other vapor passages in a form of grooves provided on circular hot gas pipes of the invention.
Figure 9:
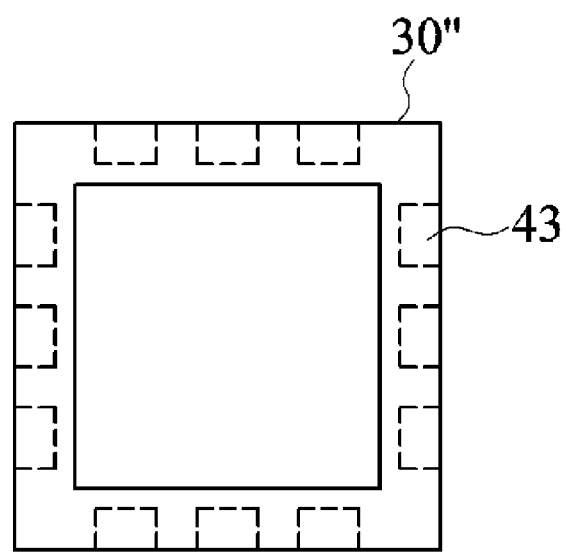
FIG. 9 is a schematic diagram illustrating other vapor passages in a form of grooves provided on square hot gas pipes of the invention.

In yet another embodiment of the invention, vapor passages are provided in the main body of the aforementioned reduction apparatus, for timely and quickly elimination of high metallic vapor pressure formed in some parts of the reduction apparatus during a reduction reaction process, whereby the metallic vapor travels along the vapor passages and escapes to the metallic vapor exit. The aforementioned vapor passages can be any structure and in any form that is suitable for gases to flow through quickly. For example, the vapor passages can be guiding structures or tubes 40 having through holes 41 as shown in FIG. 7, whereby the metallic vapor near the tubes 40 passes through the though holes 41 and flows along the tubes 40 toward the top portion 11 of the reduction apparatus. Then, the metallic vapor moves along a space 42 near the top portion 11 to reach the metallic vapor exit 16 and enters the metal collector/the condenser 19. Moreover, the passages can also be grooves on the inner wall of the main body, structures having grooves, or chamber-shaped structures having through holes, etc. Furthermore, the vapor passages can be grooves on the hot gas pipes of the aforementioned embodiments. For example, FIGS. 8 and 9, which are respectively enlarged views of the hot gas pipes 30' and 30" of FIGS. 5 and 6, illustrate the hot gas pipes 30' and 30" having grooves 43 provided on the pipe wall for the metallic vapor to flow through. The grooves 43 are represented by dotted lines in the figures to illustrate that they only extend to the proximity of the top portion and the bottom portion of the reduction apparatus, unlike the hot gas pipes which penetrate through the top portion and bottom portion of the reduction apparatus.

In addition, the width of the aforementioned grooves and the diameter of the aforementioned through holes are preferably smaller than the briquette size of the reactant material so as to prevent the reactant material from entering the grooves or the through holes. Furthermore, for an effective elimination of high metallic vapor pressure formed at some parts of the reduction apparatus, the shape and arrangement of the aforementioned vapor passages should be such that the distance between any reactant material and the closest groove, or the closest through hole, is not greater than 12 cm, and preferably, 6 cm. In comparison with conventional technology, this embodiment can timely and effectively eliminate regional high metallic vapor pressure formed by the metallic vapor escaped from the reactant material in the reduction reaction, guaranteeing a normal and continuous course of the reduction reaction. As a result, the production efficiency and output per unit time are increased while the energy consumption and the production cost are lowered.

In general, reduction apparatuses are worked under a condition of a temperature over 1000° C. and an internal pressure less than 100 Pa, and heat in the reduction apparatus is easily lost through the inlet and the outlet. In addition, if the reactant material at the outlet end of the reduction apparatus resides outside of the chamber of the reduction furnace, not only would the heat in the reduction apparatus be transferred out of the chamber structure, but a part of the reactant material would not be subjected to direct heating in the chamber. Consequently, the required reduction reaction temperature cannot be reached, and the normal course of the reaction is affected, causing a waste of the reactant material and energy. The inventor made improvements to the aforementioned reduction apparatus to solve this problem.

Figure 10:
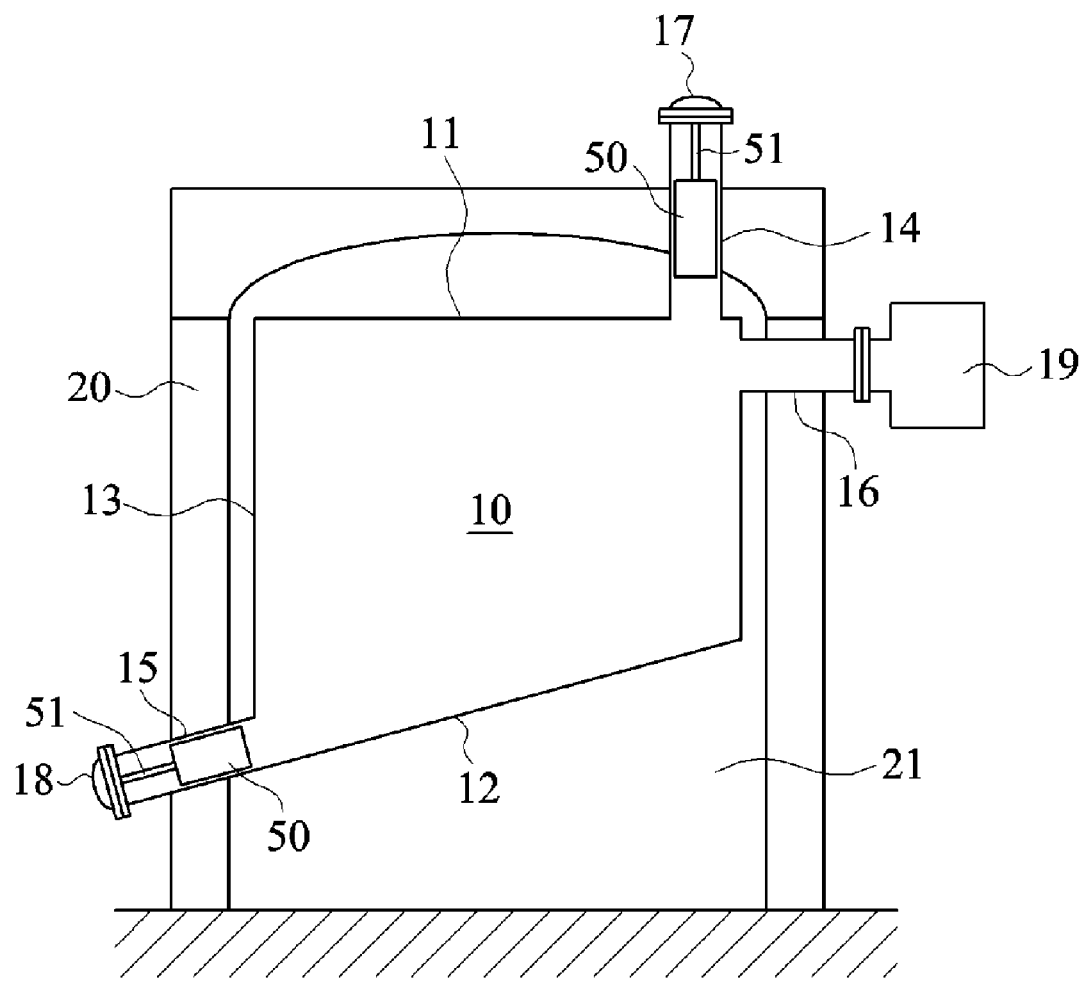
FIG. 10 is a schematic diagram illustrating a heat-insulating plug provided inside an inlet and an outlet of a reduction apparatus of the invention.

FIG. 10 is a schematic diagram illustrating a reduction apparatus according to another embodiment of the invention. The structure of this reduction apparatus is similar to the reduction apparatus of the aforementioned embodiment, wherein the difference is that a heat-insulating plug 50 for heat insulating purpose is provided inside each of the inlet and the outlet of the reduction apparatus of this embodiment. The heat-insulating plug 50 is for reducing heat loss in the reduction apparatus, and the heat-insulating plug 50 provided in the outlet 15 also acts to hold the reactant material in the reduction apparatus. The reactant material therefore stays within the chamber 21 of the reduction furnace during a reduction process and thus can be directly heated in the chamber 21 to reach a suitable reaction temperature. The heat-insulating plug 50 may be of a piston shape and a rod 51 is provided in each of the inlet 14 or the outlet 15 to support it. For a better heat insulation effect, the thickness of the heat-insulating plug 50 should be more than 5 cm and the heat insulating plug 50 should be made of refractory heat-insulating material. In this embodiment, a heat-insulating plug is provided in each of the inlet and the outlet, and thereby the heat loss in the reduction apparatus is greatly reduced. Moreover, the reactant material at the outlet end of the reduction apparatus is held to stay within the chamber of the reduction furnace and subjected to direct heating. Thus energy consumption and production cost are reduced.

In the aforementioned embodiments, if the inlet, outlet, and metallic vapor exit that are exposed outside the chamber structure are made of the same high heat-conducting material as the main body of the reduction apparatus that is retained within the chamber, heat in the chamber would be massively transferred out. The heat transfer would affect the reduction reaction and result in condensation of metallic vapor at the inlet and the outlet. In addition, the transferred heat would put the inlet, the outlet, and the metallic vapor exit at high temperature, and thereby increasing the difficulty of hermetic sealing between the inlet and the inlet closure, the outlet and the outlet closure, and the metallic vapor exit and the metal collector/the condenser. The inventor made further improvements to the reduction apparatus mentioned above to solve this problem.

Figure 11:
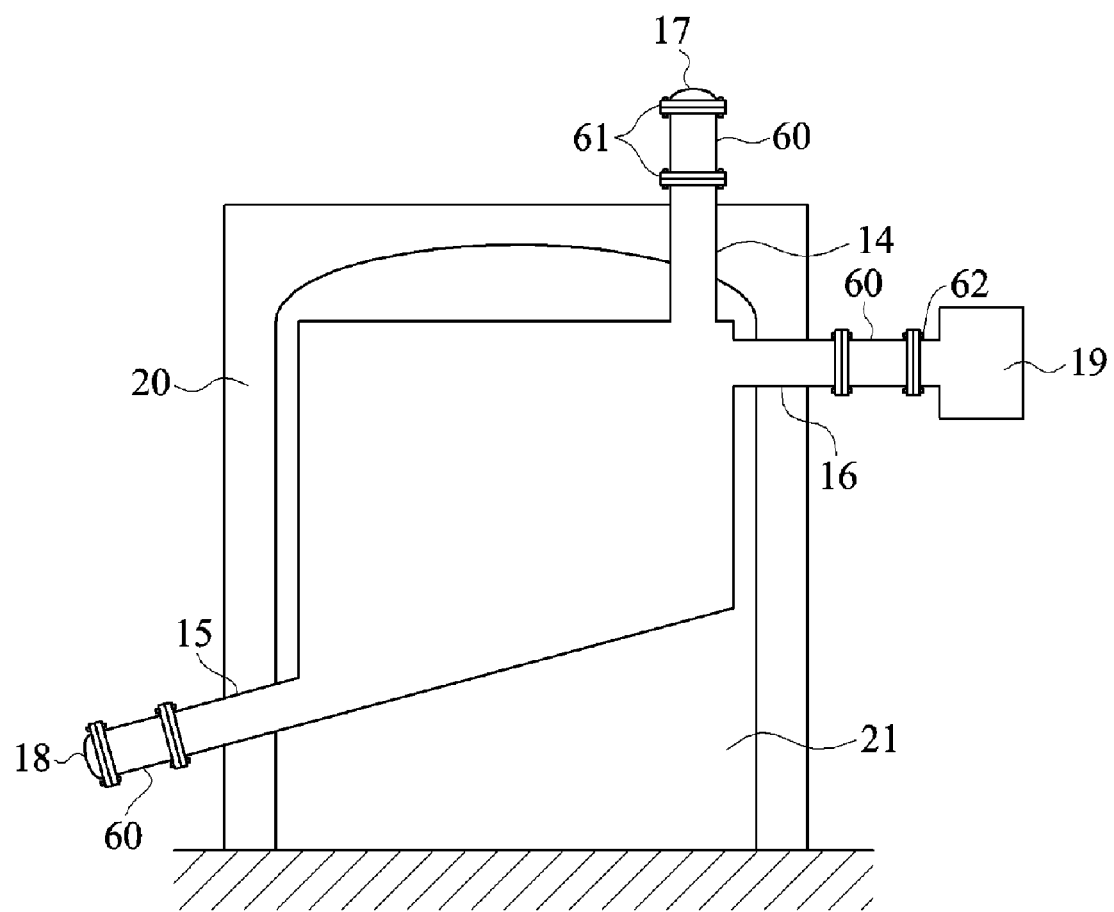
FIG. 11 is a schematic diagram illustrating a heat-insulating section provided at each junction between an inlet closure and an inlet, an outlet closure and an outlet, and a metal collector or a condenser and a metallic vapor exit, of a reduction apparatus of the invention.

FIG. 11 is a schematic diagram illustrating a reduction apparatus according to another embodiment of the invention. The structure of this reduction apparatus is similar to the structure of the reduction apparatus mentioned above, wherein the difference is that heat-insulating sections 60 are provided in the reduction apparatus of this embodiment. A heat-insulating section 60 is disposed at each junction between the inlet closure 17 and the inlet 14, the outlet closure 18 and the outlet 15, and the metal collector/the condenser 19 and the metallic vapor exit 16. The heat-insulating section 60 is disposed outside of the chamber structure 20 of the reduction furnace. Flanges 61 are used to couple the heat-insulating section 60 and the inlet closure 17, the heat-insulating section 60 and the inlet 14, the heat-insulating section 60 and the outlet closure 18, the heat insulating section 60 and the outlet 15, and the heat insulating section 60 and the metal collector/ the condenser 19, and the heat insulating section 60 and the metallic vapor exit 16. The flanges 61 are fixed by bolts 62 wrapped in heat-insulating pads or heat-insulating tubes. The heat-insulating section 60 is made of refractory heat-insulating material. For example, it is cast with corundum preparation or corundum cast material, aluminum oxide hollow sphere cast material, mullite hollow sphere cast material, or zirconia hollow sphere cast material, or made with ceramic fiber material. Moreover, in order to attain hermetic sealing, a refractory sealing material (not shown), such as graphite or refractory cotton, is placed/inserted between the heat-insulating section 60 and the inlet closure 17, between the heat-insulating section 60 and the inlet 14, between the heat-insulating section 60 and the outlet closure 18, between the heat-insulating section 60 and the outlet 15, between the heat-insulating section 60 and the metal collector/the condenser 19, and between the heat-insulating section 60 and the metallic vapor exit 16.

In this embodiment, since the heat-insulating sections are separately disposed between the inlet closure and the inlet, between the outlet closure and the outlet, and between the metal collector/the condenser and the metallic vapor exit, the heat loss in the chamber of the reduction furnace is greatly reduced. Therefore, the condensation of metallic vapor at the inlet and the outlet is prevented, solving the hermetic sealing problem under high temperature. Consequently, the energy consumption and the production cost are reduced.

The main body and the hot gas pipes of the reduction apparatus of the aforementioned embodiments can be made of any refractory heat-conducting material such as refractory alloy steel. Particularly, the main body and the hot gas pipes can be prepared with silicon carbide-based material, the use of which improves the oxidation, creep and tear phenomenon that easily occur at high temperature in conventional reduction apparatuses made of heat resisting nickel-chrome-steel alloy. The silicon carbide-based material is silicon carbide-based refractory cast material or batter material having a composition of 85 to 98 weight percentage of silicon carbide-based raw material, 2 to 15 weight percentage of aluminate cement, and 0.05 to 1.0 weight percentage of water reducing agent. The reduction apparatus with silicon carbide main body and hot gas pipes has much better resistance to compression, bending, and tension, which helps in prolonging its service life. It can also work and be operated at above 1200° C. but under 1500° C., a temperature range which is high enough to shorten the reduction time, leading to a decrease in the usage and preparation cost of reduction apparatuses.

Figure 12:
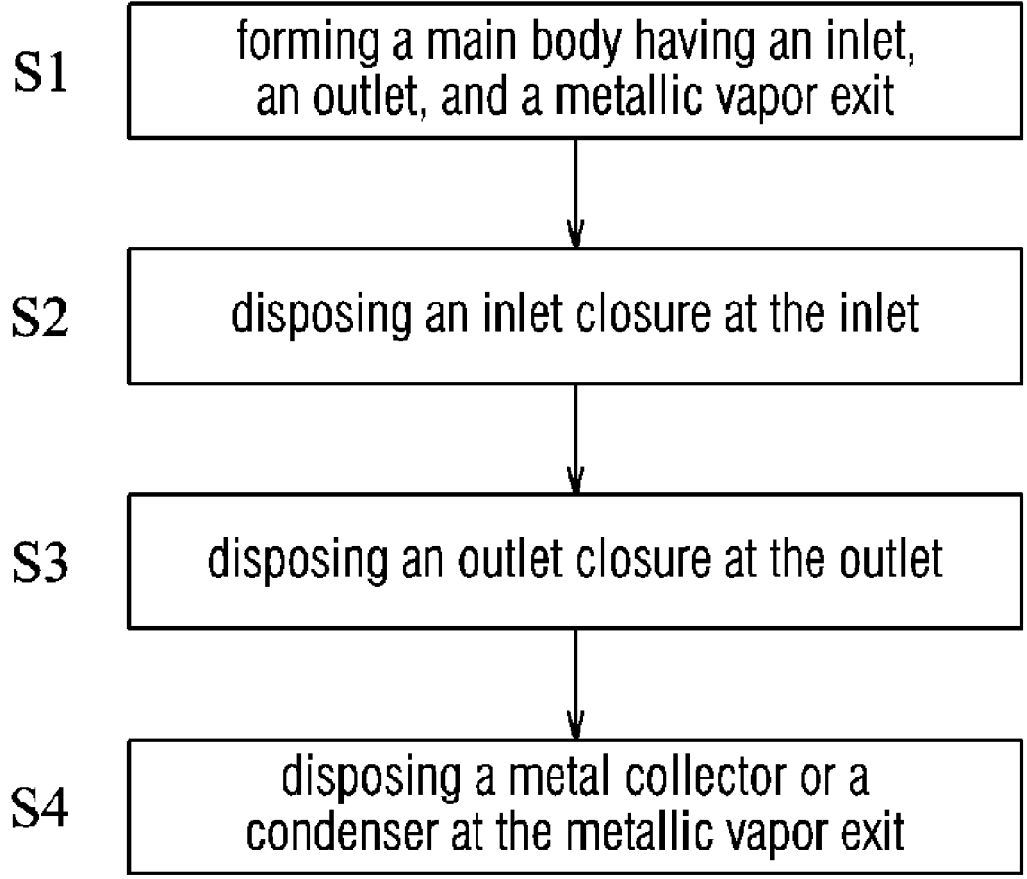
FIG. 12 is a flow chart of a manufacture method of a reduction apparatus according to the invention.

A manufacture method of reduction apparatus of the invention is as shown in FIG. 12. Firstly, a main body having a top portion, a bottom portion, and a side portion is formed (S1). The bottom portion includes a slanted plane. The main body is further provided with an inlet and a metal vapor exit near its top portion and an outlet near its bottom portion. The main body can be made of any refractory heat-conducting material, for example, heat-resisting alloy steel, and generally, the manufacture process is to melt the alloy steel and pour it into a mold for casting, or to cast the melted alloy steel into different components and then weld the components together. The main body can also be prepared with silicon carbide as the basic material, to improve the resistance to oxidization, creep and tear phenomenon, which are easily incurred by conventional reduction apparatus material like heat resisting nickel-chrome-steel alloy at high temperature. This silicon carbide main body of reduction apparatus is formed by: mixing silicon carbide-based refractory cast material or batter material with 4% to 10% of water, followed by pouring the mixture into a mold for casting or battering the mixture into shape, and then curing to obtain the prepared product. The silicon carbide-based refractory cast material or batter material has a composition of 85 to 98 weight percentage of silicon carbide-based raw material, 2 to 15 weight percentage of aluminate cement, and 0.05 to 1.0 weight percentage of water reducing agent like sodium hexametaphosphate or sodium tripolyphosphate. The silicon carbide (SiC) content in the silicon carbide-based raw material is greater than or equal to 90% while the aluminum oxide ($Al_2O_3$) content in the aluminate cement is greater than or equal to 55%.

Secondly, an inlet closure is disposed at the inlet (S2), and an outlet closure is disposed at the outlet (S3), and a metal collector/a condenser is disposed at the metallic vapor exit (S4). Thus, the making of a reduction apparatus is complete. It is to be noted that flanges are used to couple the inlet and the inlet closure, the outlet and the outlet closure, and the metallic vapor exit and the metal collector/the condenser.

The manufacture method of reduction apparatus mentioned above is just a general description; the steps can be varied according to acquired functions of the reduction apparatus. For instance, if the speed at which reactant material in the reduction apparatus is heated is to be increased, hot gas pipes can be provided inside the main body that are solidly bonded to the main body and penetrate the top portion and the bottom portion of the main body. Also, if the high metallic vapor pressure formed regionally in the reduction apparatus is to be eliminated, vapor passages can be provided inside the main body of the reduction apparatus so that the metallic vapor can travel along the vapor passages and escape to the metallic vapor exit. As well, if the heat loss in the reduction apparatus is to be minimized, a heat-insulating plug can be provided inside the inlet, and inside the outlet. In addition, heat-insulating sections can each be disposed between the inlet closure and the inlet, between the outlet closure and the outlet, and between the metal collector/the condenser and the metallic vapor exit, for reducing heat loss.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretations so as to encompass all such modifications and similar arrangements.

What is claimed is:

1. A reduction apparatus comprising:
   a main body made of silicon carbide-based material and collectively formed by a top portion, a bottom portion, and a side portion, the main body having an inlet, an outlet, and a metallic vapor exit, and the bottom portion including a slanted plane, wherein the inlet is provided at the top portion, the metallic vapor exit is provided at the top portion or the side portion near the top portion, and the outlet is provided at the bottom portion or the side portion near the bottom portion;
   an inlet closure connected with the inlet;
   an outlet closure connected with the outlet;
   a metal collector or a condenser, connected with the metallic vapor exit; and
   hot gas pipes provided inside the main body, wherein the hot gas pipes are solidly bonded to the main body and penetrate through the top portion and the bottom portion of the main body.

2. The reduction apparatus as described in claim 1, wherein the main body is a cylinder with obliquely truncated bottom.

3. The reduction apparatus as described in claim 1, wherein the main body is a cylinder with obliquely truncated top and obliquely truncated bottom.

4. The reduction apparatus as described in claim 1, wherein the slanted plane of the bottom portion is a flat surface, a conical surface, or a circular arc surface.

5. The reduction apparatus as described in claim 1, wherein the slanted plane is inclined at an angle of 20° to 70° from a horizontal plane.

6. The reduction apparatus as described in claim 1, wherein the slanted plane is inclined at an angle of 30° to 60° from a horizontal plane.

7. The reduction apparatus as described in claim 1, wherein the solid bonding is achieved by casting the man body and the hot gas pipes in a single mold.

8. The reduction apparatus as described in claim 1, wherein the shape and arrangement of the hot gas pipes are such that the distance between any reactant material and the closest hot gas pipe, or the closest wall of the main body, does not exceed 12 cm.

9. The reduction apparatus as described in claim 1, wherein the shape and arrangement of the hot gas pipes are such that the distance between any reactant material and the closest hot gas pipe, or the closest wall of the main body, does not exceed 6 cm.

10. The reduction apparatus as described in claim 1, further comprising:
    vapor passages provided inside the main body, through which metallic vapor escapes to the metallic vapor exit.

11. The reduction apparatus as described in claim 10, wherein the vapor passages are provided in a form of grooves on the inner wall of the main body, structures having grooves, chamber-shaped structures having through holes, tubes having through holes, or grooves on the hot gas pipes.

12. The reduction apparatus as described in claim 11, wherein the width of the grooves and the diameter of the through holes are smaller than the size of reactant material.

13. The reduction apparatus as described in claim 11, wherein the shape and arrangement of the vapor passages are such that the distance between any reactant material and the closest groove, or the closest through hole, does not exceed 12 cm.

14. The reduction apparatus as described in claim 11, wherein the shape and arrangement of the vapor passages are such that the distance between any reactant material and the closest groove, or the closest through hole, does not exceed 6 cm.

15. The reduction apparatus as described in claim 1, further comprising:
    a heat-insulating plug provided within each of the inlet and the outlet.

16. The reduction apparatus as described in claim 15, wherein the reduction apparatus is for use in a vacuum smelting reduction furnace, and the heat-insulating plug provided inside the outlet holds reactant material in the reduction apparatus within the chamber of the reduction furnace during a reduction process.

17. The reduction apparatus as described in claim 15, wherein the heat-insulating plug is in a piston shape.

18. The reduction apparatus as described in claim 15, further comprising:

a rod provided in each of the inlet and the outlet, for supporting the heat-insulating plug.

19. The reduction apparatus as described in claim 15, wherein the thickness of the heat-insulating plug is not less than 5 cm.

20. The reduction apparatus as described in claim 15, wherein the heat-insulating plug is made of refractory heat-insulating material.

21. The reduction apparatus as described in claim 1, further comprising:
a heat-insulating section disposed at each junction between the inlet closure and the inlet, between the outlet closure and the outlet, and between the metal collector or the condenser and the metallic vapor exit.

22. The reduction apparatus as described in claim 21, wherein the reduction apparatus is for use in a vacuum smelting reduction furnace, and the heat-insulating section is disposed outside of the chamber structure of the reduction furnace.

23. The reduction apparatus as described in claim 21, wherein flanges are used to couple the heat-insulating section and the inlet closure, the heat-insulating section and the inlet, the heat-insulating section and the outlet closure, the heat-insulating section and the outlet, the heat-insulating section and the metal collector or the condenser, and the heat-insulating section and the metallic vapor exit.

24. The reduction apparatus as described in claim 23, wherein the flanges are fixed by bolts covered with heat-insulating pads or heat-insulating tubes.

25. The reduction apparatus as described in claim 21, wherein the heat-insulating section is made of refractory heat-insulating material.

26. The reduction apparatus as described in claim 21, wherein the heat-insulating section is made by casting with corundum preparation or corundum cast material, aluminum oxide hollow sphere cast material, mullite hollow sphere cast material, or zirconia hollow sphere cast material, or made with ceramic fiber material.

27. The reduction apparatus as described in claim 21, further comprising:
refractory sealing material inserted between the heat-insulating section and the inlet closure, between the heat-insulating section and the inlet, between the heat-insulating section and the outlet closure, between the heat-insulating section and the outlet, between the heat-insulating section and the metal collector or the condenser, and between the heat-insulating section and the metallic vapor exit.

28. The reduction apparatus as described in claim 27, wherein the refractory sealing material is graphite or refractory cotton.

29. The reduction apparatus as described in claim 1, wherein the silicon carbide-based material is silicon carbide-based refractory cast material or batter material having a composition of 85 to 98 weight percentage of silicon carbide-based raw material, 2 to 15 weight percentage of aluminate cement, and 0.05 to 1.0 weight percentage of water reducing agent.

30. The reduction apparatus as described in claim 29, wherein the silicon carbide-based raw material has a silicon carbide (SiC) content greater than or equal to 90%, and the aluminate cement has an aluminum oxide ($Al_2O_3$) content greater than or equal to 55%.

31. The reduction apparatus as described in claim 1, wherein the hot gas pipes are made of silicon carbide-based material.

32. A vacuum smelting reduction furnace, comprising:
a reduction apparatus as described in claim 1; and
a chamber structure;
wherein the main body of the reduction apparatus is positioned inside the chamber surrounded by the chamber structure, while the metal collector, the inlet closure, and the outlet closure are disposed outside of the chamber structure.

* * * * *